United States Patent [19]

Hood, Jr.

[11] Patent Number: 4,773,990
[45] Date of Patent: Sep. 27, 1988

[54] AXIAL FLOW FILTER HAVING ENTRY AND EXIT FILTRATION STAGES AND FLOW DISTRIBUTION MEANS

[75] Inventor: James H. Hood, Jr., Knoxville, Tenn.

[73] Assignee: Filmax, Inc., Knoxville, Tenn.

[21] Appl. No.: 919,069

[22] Filed: Oct. 15, 1986

[51] Int. Cl.$^4$ ............................................. B01D 25/04
[52] U.S. Cl. ................................... 210/314; 210/437; 210/439; 210/497.1; 55/498; 55/520
[58] Field of Search ............... 210/314, 317, 345, 347, 210/434, 437, 439, 440, 443, 483, 450, 509, 497.1; 55/497, 498, 520

[56] References Cited

U.S. PATENT DOCUMENTS

| | | | |
|---|---|---|---|
| 2,076,934 | 4/1937 | Burckhalter | 210/134 |
| 2,076,936 | 3/1937 | Burckhalter | 210/134 |
| 2,311,320 | 2/1943 | Williams | 210/131 |
| 2,543,165 | 2/1951 | Harlan | 210/131 |
| 2,739,713 | 3/1956 | Robinson | 210/164 |
| 2,868,383 | 1/1959 | Nichols | 210/323 |
| 2,888,141 | 5/1959 | Coates et al. | 210/440 |
| 2,895,615 | 7/1959 | Oathout | 210/439 |
| 3,105,042 | 9/1963 | Roosa | 210/94 |
| 3,154,487 | 10/1964 | Thornton et al. | 210/323 |
| 3,308,956 | 3/1967 | Yee et al. | 210/232 |
| 3,390,778 | 7/1968 | Uhen | 210/314 |
| 3,465,883 | 9/1969 | Jumper | 210/307 |
| 3,487,942 | 1/1970 | Lee et al. | 210/439 |
| 3,504,803 | 4/1970 | Brayman | 210/439 |
| 3,537,592 | 11/1970 | Ogden | 310/343 |
| 3,696,932 | 10/1972 | Rosenberg | 210/437 |
| 3,988,244 | 10/1976 | Brooks | 210/440 |
| 4,017,400 | 3/1977 | Schade | 210/439 |
| 4,320,000 | 3/1982 | Lange et al. | 210/437 |
| 4,366,057 | 12/1982 | Bridges et al. | 210/437 |
| 4,422,790 | 12/1983 | Gebert et al. | 403/11 |
| 4,557,829 | 12/1985 | Fields | 210/509 |
| 4,579,657 | 4/1986 | Hood, Jr. | 210/314 |
| 4,588,503 | 5/1986 | Sugiura | 210/439 |

FOREIGN PATENT DOCUMENTS 47-132119 8/1969 Japan.
808154 1/1959 United Kingdom.

Primary Examiner—Richard V. Fisher
Assistant Examiner—Wanda L. Millard
Attorney, Agent, or Firm—Luedeka, Hodges & Neely

[57] ABSTRACT

The specification discloses improvements in axial flow filters of the type having filter elements constructed of spirally wound tissue layers and having planar fluid entry and exit surfaces located at their opposite axial ends. Entry and exit filtration stages are provided in the form of annular webs of filter media covering the entry and exit surfaces the filter elements to provide additional filtration of fluid entering and exiting the elements. The filter media comprising the entry filtration stage is specially adapted for distributing the flow evenly across the entry surfaces of the filter element to minimize the formation of bypass flow channels between the tissue layers, and for plugging any bypass flow channels that form to effect a distribution of the flow to areas on the entry surfaces where bypass flow channels do not exist. The filter media comprising the exit filtration stage is maintained against the fluid exit surface and sealed thereto so that fluid passing out of the fluid exit surface cannot bypass the filter media.

3 Claims, 5 Drawing Sheets

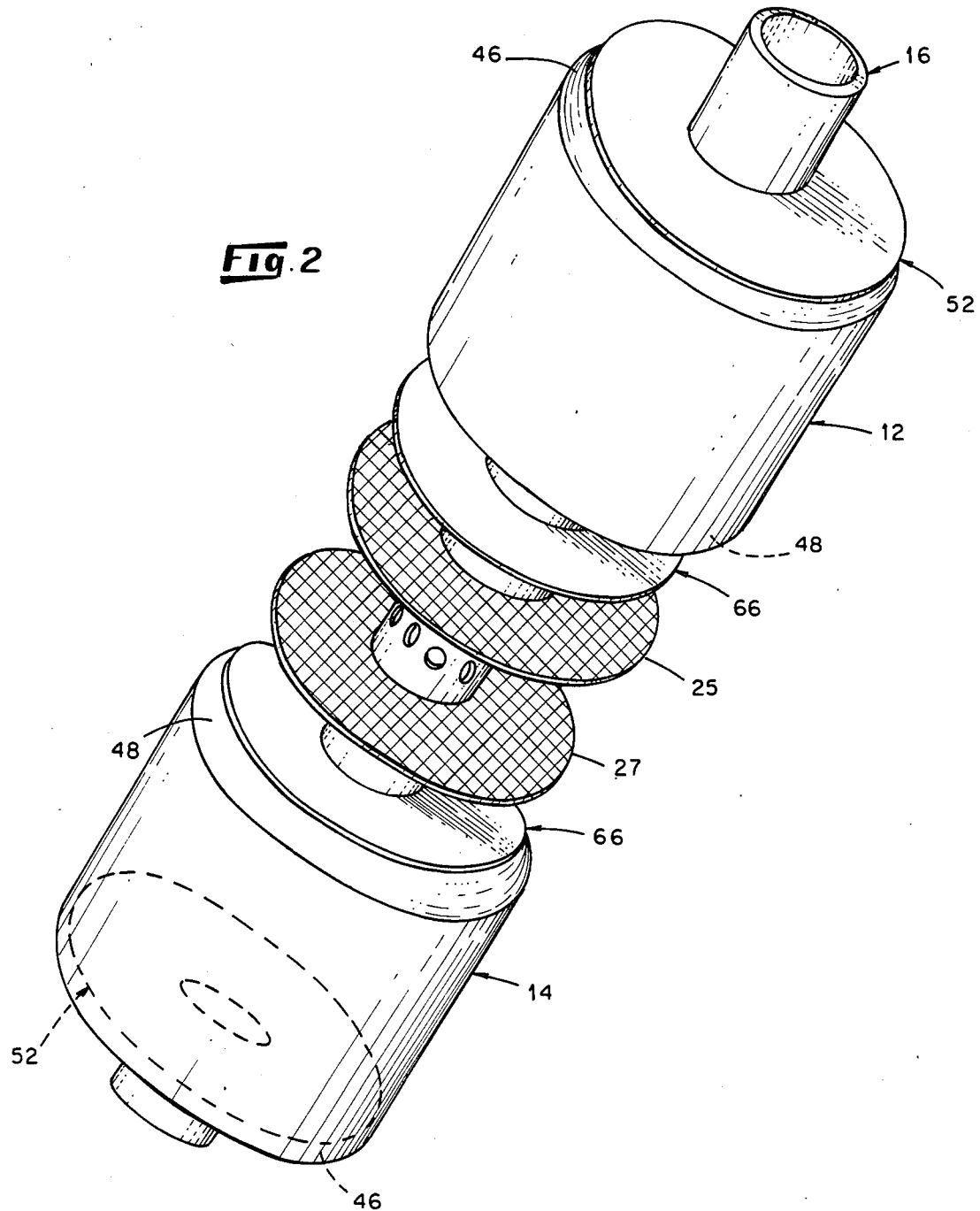

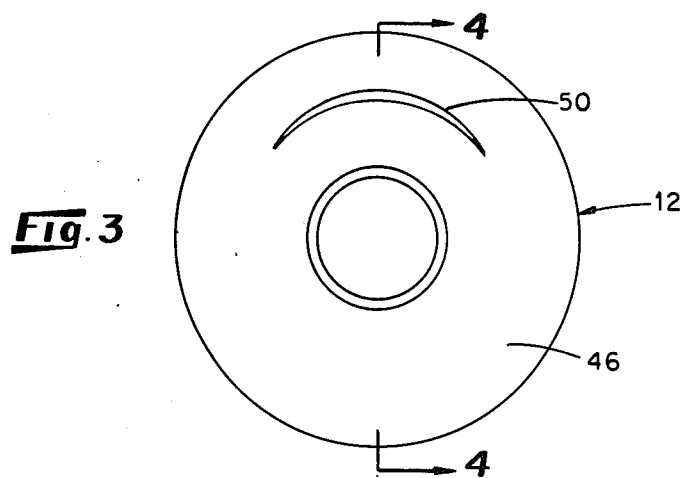
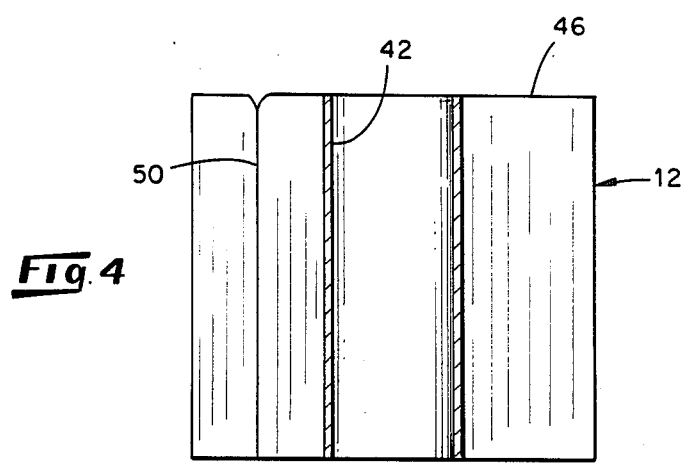
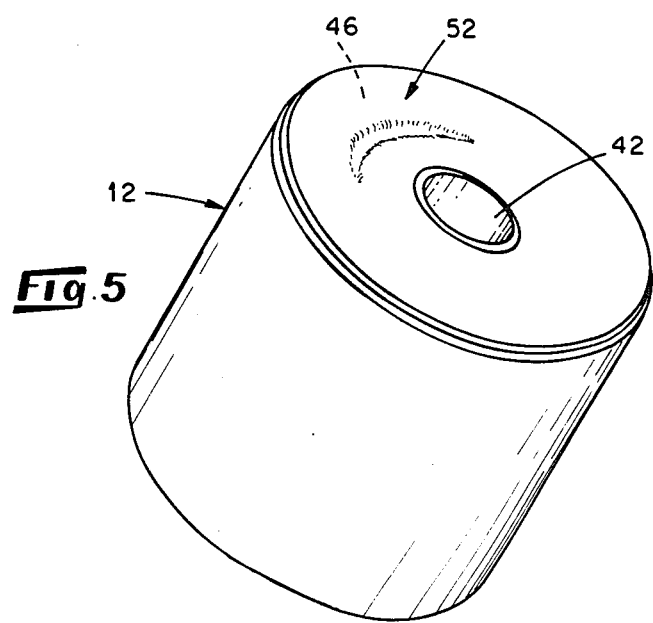

AXIAL FLOW FILTER HAVING ENTRY AND EXIT FILTRATION STAGES AND FLOW DISTRIBUTION MEANS

The present invention relates to axial flow fluid filters and more particularly relates to improvements in an axial flow fluid filter having filter elements constructed of spirally wound tissue layers to which are added entry and exit filtration stages and means for maintaining an even distribution of flow into the elements to minimize formation of axial flow bypass channels down through the tissue layers and for plugging any such bypass flow channels that form.

Axial flow fluid filters having filter elements constructed of spirally wound tissue layers ordinarily accomplish filtering of contaminants by passing the fluid through and between the individual tissue layers where contaminants are trapped and any water in the fluid is absorbed into the tissue. Filters of this type are especially popular in applications involving motor oils and hydraulic fluids because of their efficiency and relatively low costs.

A significant problem associated with the use of axial flow filters has been leakage of contaminated fluid around the wound tissue filter elements. Ordinarily, the filter elements are positioned on a flow tube and contaminated fluid is directed to one axial end surface of the element where the fluid enters the tissue layers in an axial direction, flows through the layers, and out the opposite axial end surface of the element into an annular channel and then into the flow tube. The pressure differences between the axial ends of the element, and between the outer cylindrical surface of the elements and the annular channel are typically very high, encouraging leakage around the elements permitting unfiltered fluid to contaminate the filtered fluid. Numerous attempts have been made to fashion a seal which will prevent flow bypass of this type. However, until development of the seals disclosed in U.S. Pat. No. 4,579,657 to Hood, significant flow bypass around the filter elements has persisted.

As disclosed in the Hood patent, an outer seal is provided between two filter elements which prevents unfiltered fluid from contaminating filtered fluid flowing out of the fluid exit surfaces of the filter elements. Also disclosed is an annular seal between the flow tube and the filter elements preventing bypass of contaminated fluid between the filter elements and the tube. These and other aspects of the Hood patent, when incorporated into a filter having elements comprised of spirally wound tissue, have substantially eliminated flow bypass at the indicated locations.

The developments in filtration offered by the Hood patent have prompted the emergence of a previously unencountered or unnoticed weakness in a filtration system employing wound tissue filter elements. That is, the more tightly sealed filter elements have been found, on occasion, to develop axial flow bypass channels down through the filter elements themselves. These bypass channels may result in direct, substantially uninhibited, flow communication between the fluid entry surface and the fluid exit surface the element allowing unfiltered fluid to completely escape filtration. This unexpected occurrence has presented a new problem for filter manufacturers and developers.

Accordingly, a need exists for an axial for filter of the type having filter elements constructed of spirally wound tissue layers wherein means are provided which minimize formation of axial flow bypass channels directly through the tissue layers and which, upon formation of any such channels, act to plug off flow into the channels so that an even distribution of flow into the entry surface of the filter element is achieved and bypass flow is substantially eliminated.

In a similar respect, there has generally been continued effort on the part of filter manufacturers and developers to produce more effective filter systems in terms of the contaminant removal and flow-through characteristics of the filter elements themselves, without regard to any leakage problems. In the particular area of axial flow filters employing wound tissue layer filter elements, developments have generally involved the addition, rearrangement or reconfiguration of the filter elements with only minor improvements in terms of filtration effectiveness. As a result, a further and related need exits for a filter which is substantially more effective in terms of contaminant removal and flow through characteristics than existing filters having wound tissue layer filter elements.

The present invention meets the above needs, among others, through provision of an improved filter apparatus of the character described in which the formation of axial flow bypass channels is minimized and wherein any channels which do form are closed up so that bypass flow is eliminated; and through provision of entry and exit filtration stages adjacent the fluid entry and exit surfaces of the filter elements to substantially improve the filtration effectiveness of the elements.

In accordance with a preferred form of the invention, an improvement is provided in a filter apparatus for filtering fluids having at least one filter element constructed of spirally wound tissue layers. The filter element is configured to filter contaminants from the fluid by passing the contaminated fluid into a fluid entry surface thereof disposed in a plane generally perpendicular to the tissue layers and located at a first axial end of the element, through and between the tissue layers in a substantially axial direction towards a second axial end of the element, and out of a fluid exit surface located at the second axial end of the filter element. In a preferred form, the improvement comprises entry filter means disposed adjacent the fluid entry surface for filtering the fluid flowing into the fluid entry surface. The entry filter means is configured to provide an even distribution of the flow of fluid across the fluid entry surface which minimizes the tendency of fluid flowing into the fluid entry surface to produce channels between the tissue layers, which channels extend axially through the filter element from openings in the fluid entry surface and permit contaminated fluid flowing therein to bypass filtration. The entry filter means is also capable of substantially plugging any of the channels which are opened by fluid flowing into the fluid entry surface. Channel formation of the type indicated above is a recent phenomena discovered to occur when the filter elements have been effectively sealed to eliminate bypass flow around the filter elements and increase the pressure difference across the elements. The present invention addresses this new problem and provides a simple and effective means for solving it as well as providing an additional filtration stage at the fluid entry surface of the filter elements.

In accordance with a further aspect of the invention, the entry filter means has an outer surface facing away from the fluid entry surface and is configured to filter a portion of the larger particular contaminants from the fluid, which particulate contaminants become deposited generally on the outer surface of the entry filter means as contaminated fluid flows into the fluid entry surface of the element. The entry filter means is further configured to be drawn against the fluid entry surface in response to fluid flow therethrough so that the outer surface of the entry filter means generally conforms to the shape of the fluid entry surface. As a result, regions of the entry filter means are drawn into the openings in the fluid entry surface. A disproportionately large amount of particulate contaminants are collected on the upper surface of the entry filter means in the regions drawn into the openings relative to the amount of particulate contaminants collected on the upper surface outside of the regions. The particulates collected in the regions substantially decrease the rate of fluid flowing into the fluid entry surface through the regions relative to the rate of fluid flowing into the fluid entry surface outside of the regions causing the channels to be substantially plugged.

In accordance with another aspect of the invention, exit filter means are provided adjacent the fluid exit surface of the filter element for substantially removing particulates remaining in the fluid passing out of the fluid exit surface. Seal means are also provided for sealing the exit filter means to the fluid exit surface so that fluid exiting the fluid exit surface passes substantially only through the exit filter means. Further means are provided for maintaining the exit filter means in the immediate vicinity of the fluid exiting the exit surface. According to this aspect of the invention, an exit filtration stage is provided for capturing particles that find their way through the tissue layers and would otherwise have been recirculated into the system from which the fluid is drawn. Preferably, the seal means comprises a thermoplastic material having a melting point higher than the highest expected operating temperature of the filter. The material is adapted to adhere to the exit filter means and to the filter element and flow tube, and is applied so that fluid exiting the fluid exit surface is substantially confined within the space between the fluid exit surface and the exit filter means before passing through the exit filter means. A primary benefit of the seal is in the nature of eliminating bypass flow around the exit filter means and insuring that all of the fluid exiting the fluid exit surface is subjected to the final or exit filtration stage.

These and other advantages and further aspects of the present invention will be readily appreciated by those of ordinary skill in the art as the same becomes better understood by reference to the following detailed description when considered in conjunction with the accompanying drawings in which:

FIG. 2 is an exploded perspective view of various internal components of the filter apparatus;

FIG. 3 is a somewhat diagrammatic view of the top of an axial flow filter element constructed of spirally wound tissue layers illustrating formation of an axial flow bypass channel down through and between the tissue layers of the filter element;

FIG. 4 is a view along line 4—4 of the filter element shown in FIG. 3;

FIG. 5 is a perspective view of the filter element of FIG. 3 illustrating the use of an annular web of filter media on the fluid entry surface of the filter media for the purpose of distributing the flow into the fluid entry surface and for plugging the channel;

Figure 1:
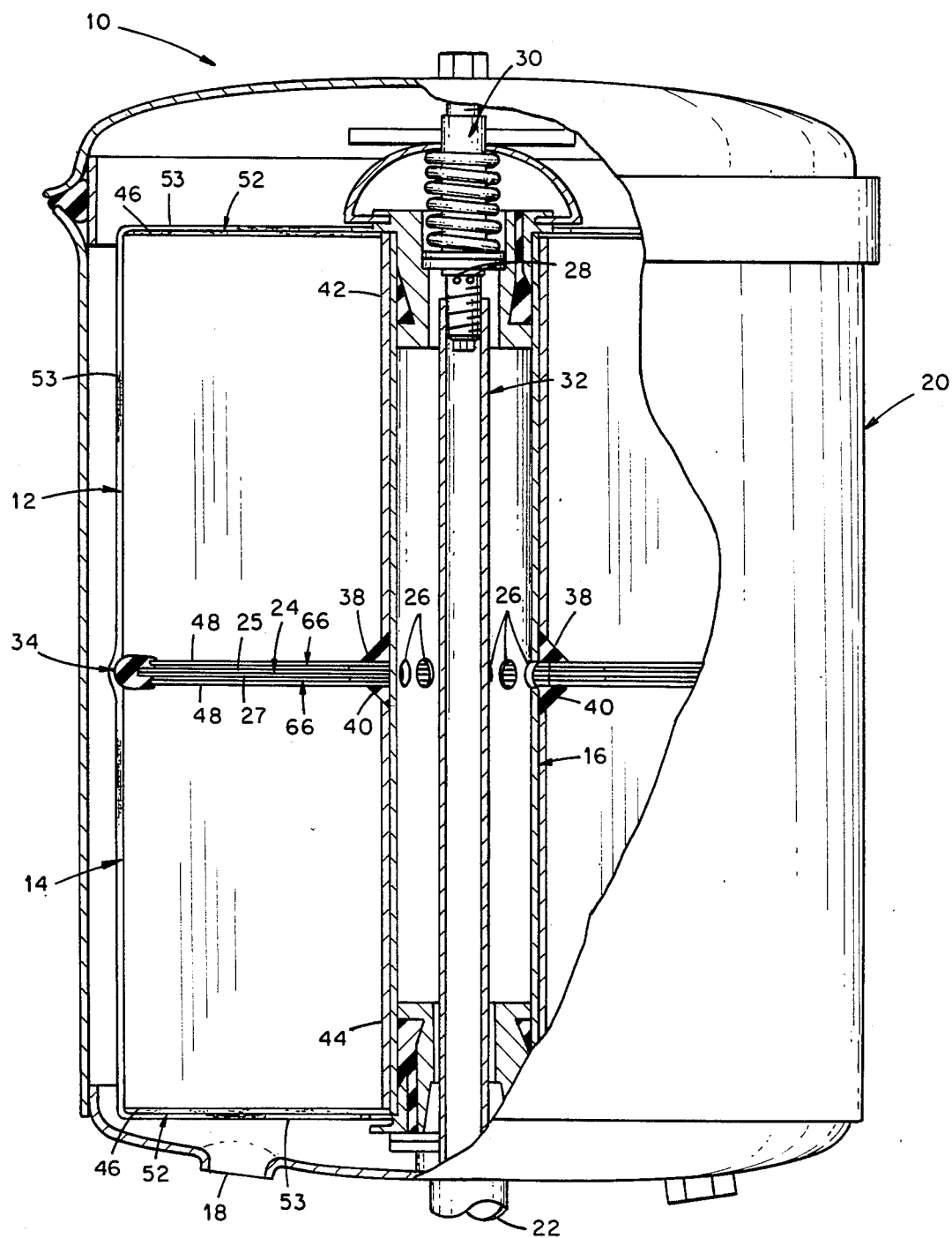
FIG. 1 is an elevational view, partially in section, of a filter apparatus illustrating features of one form of the present invention.

Referring now to the drawings in which like reference characters refer to like or similar parts throughout the several views, there is shown in FIG. 1 an axial flow filter apparatus 10 incorporating features of a preferred form of the present invention. Before describing the improvements of the present invention, the general aspects and function of the apparatus 10 will be outlined to facilitate a better understanding of the invention.

Generally, the apparatus 10 includes a pair of axial flow filter elements 12 and 14 disposed on an outer flow tube 16. Fluid enters the apparatus 10 through an entrance port 18 located in a shell 20 configured to enclose the filter elements 12 and 14 within its confines during use of the apparatus 10. Fluid exits the apparatus 10 through an exit port located at the bottom of the shell 20.

Fluid entering the apparatus 10 through the entrance port 18 flows in an axial direction through the filter elements 12 and 14 and into an annular space 24 defined between the elements. The space 24 is formed by locating a pair of annular-shaped wire mesh spacers 25 and 27 between the elements as they are positioned on the outer flow tube 16 (see FIG. 2). From the space 24, the filtered fluid passes into the outer tube 16 through a plurality of openings 26 formed in the tube 16 adjacent the space 24. Fluid in the outer tube 16 then flows up the outer tube 16 and through openings 28 in the lower end of a tightening screw 30. The fluid flows down out of an opening in the bottom end of the screw 30 and into an inner flow tube 32 which conducts the fluid to the exit port 22 and out of the apparatus 10. Many other features of the apparatus 10 are illustrated and described in U.S. Pat. No. 4,579,657 to Hood which is hereby incorporated by reference.

Of the features disclosed in the above-referenced patent to Hood, particular note is to be made of the provision of an outer seal 34 shown in FIG. 1 of the present disclosure disposed between the filter elements 12 and 14 to prevent flow communication between the annular space 24 and a fluid space 36 outside of the filter elements 12 and 14 containing the as yet unfiltered fluid. Further note is made of inner seals 38 and 40 formed adjacent the filter elements 12 and 14, respectively. The inner seals 38 and 40 serve to prevent unfiltered fluid from flowing between the filter elements 12 and 14 and the outer surface of the outer flow tube 16, and into the openings 26 therein. The indicated seals 34, 38 and 40 are preferably formed using a thermoplastic material having a melting point higher than the highest expected operating temperature of the apparatus 10 and especially adapted to adhere to the surfaces of the components of the apparatus 10 to which they are in contact. In practice, the seals have been found to prevent bypass flow of the type described around the filter elements 12 and 14 thus insuring that flow through the apparatus 10 is only possible through and between the tissue layers of the filter elements 12 and 14.

The filter elements 12 and 14 are of the type constructed of spirally wound tissue layers and may include cylindrical core supports 42 and 44 having internal diameters substantially corresponding to the exterior diameter of the outer tube 16. Each of the filter elements 12 and 14 includes a fluid entry surface 46 at one axial end thereof and a fluid exit surface 48 at the opposite axial end of the elements from the fluid entry surfaces 46. Customarily, the fluid entry surface 46 and the fluid exit surface 48 of the elements are planar in configuration and lie in a plane substantially perpendicular to the tissue layers of the elements. The objective is to achieve a flow pattern in the apparatus 10 wherein fluid flow is confined to passage substantially only into the fluid entry surfaces 46, through and between the individual tissue layers in an axial direction, and out of the fluid exit surfaces 48 into the passageway 24.

Having briefly described the general nature of the apparatus 10 and its function, the specific nature of the improvements of the present invention will now be explained with reference to FIGS. 1 through 7 generally and with specific reference being made to individual figures as required. In large part, development of the improvement of the present invention was necessitated by the fact that the seals 34, 38 and 40 described above do indeed limit the fluid flow pattern to the above-described configuration. However, it has been discovered that, on occasion, bypass channels 50 of the type illustrated in FIGS. 3 and 4 develop in the filter elements when such a fluid flow pattern is maintained. This previously unknown weakness in the filtration system is believed to have emerged primarily due to the additional pressure differences imposed across the fluid entry and exit surfaces 46 and 48 of the filter elements due to the effect of the seals. As can be seen, the channel 50 readily permits axial flow bypass directly through the filter elements themselves limiting the effectiveness of the apparatus 10 in removing contaminants from the fluid.

One form of the improvement of the present invention is therefore conceived as a means for addressing the problem of channel formation as described and preferably comprises an annular web of filter media 52 disposed on the fluid entry surface 46 of the elements 12 and 14. Preferably, the media 52 is configured with a substantially constant thickness to present a substantially constant resistance to fluid flow therethrough across its width. As will be described, the filter media 52 aids in limiting the formation of channels by more evenly distributing the fluid flow into the fluid entry surface 46, blocks fluid flow into the channels, and provides the added benefit of an entry filtration stage for capturing a portion of the larger particulates in the fluid entering the fluid entry surface 46.

Figure 6A:
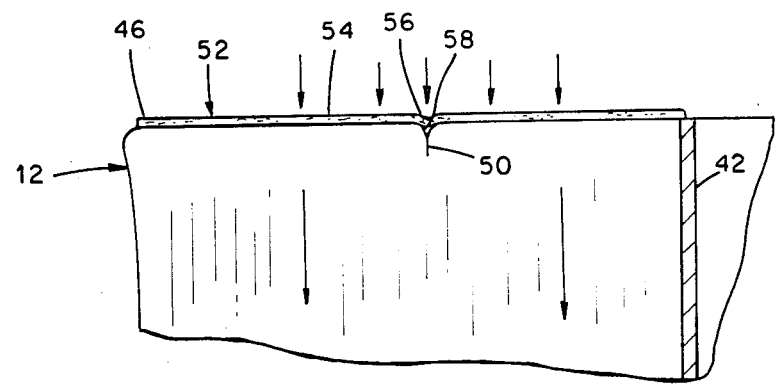
FIGS. 6a through 6c illustrate diagrammatically a process wherein the filter media illustrated in FIG. 5 accomplished plugging of the channel through deposition of particulate contaminants within a region of the filter media drawn into the channel adjacent the fluid entry surface.
Figure 6B:
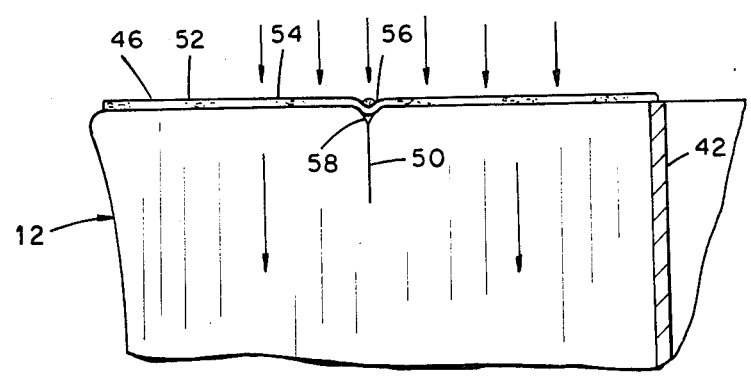
Figure 6C:
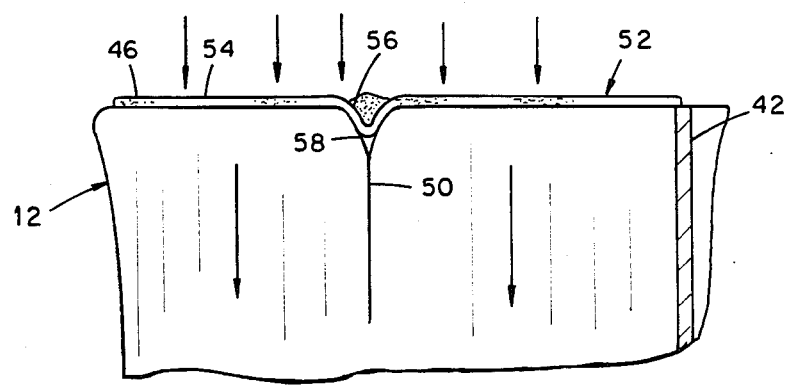

One mechanism by which the filter media 52 is believed to block flow into the channel 50 is illustrated in FIGS. 6a through 6c. Generally, the filter media 52 has an outer surface 54 facing away from the fluid entry surface 46 and is configured to filter a portion of the larger particulate contaminants from the fluid. These larger particulate contaminants become deposited generally on the outer surface 54 of the filter media 52 as contaminated fluid flows into the fluid entry surface 46. Preferably, the filter media 52 is configured to be somewhat flexible so that the force of fluid flowing through it causes the filter media 52 to be drawn against the fluid entry surface 46 so that the outer surface 54 of the filter media 52 generally conforms to the shape of the fluid entry surface 46. When a channel 50 begins to form as shown in FIG. 6a, a region 56 of the filter media 52 is drawn into an opening 58 which is appearing along the fluid entry surface 46 as the channel 50 begins to form. The opening 58 will initially be in the form of a very thin crescent shape as illustrated in FIGS. 3 and 5. As the channel 50 propagates down between the tissue layers, the opening 58 widens and a correspondingly larger region of the filter media 52 is drawn into the opening 58. As shown in FIG. 6b, particulates begin to collect in the region 56 when it reaches a certain depth. In fact, it has been found that a disproportionately large amount of particulate contaminants are collected on the upper surface 54 of the filter media 52 in the region 56 relative to the amount of particulate contaminants collected on the upper surface 54 outside of the region 56. This can be seen in the buildup of particulates in the channel 56 as the opening 58 becomes progressively larger. Eventually, sufficient particulates become deposited in the region 56 to substantially block the flow of fluid into the channel 50.

By responding to channel formation in the manner described, the filter media 52 acts to maintain a substantially even distribution of fluid flow into the fluid entry surface 46 of the filter elements. The media 52 also helps minimize initial formation of channels since it acts as a flow distribution means to even out the flow into the fluid entry surface 46, thereby to resist development of nonuniform flow velocity patterns into the fluid entry surface 46. Of course, the filter media 52 also eliminates axial flow bypass of a large portion of the particulates since the particulates collected in the region 56 would otherwise have entered the channel 50. Thus, the filter media 52 functions in a number of ways to improve the filtration effectiveness of the elements 12 and 14.

The filter media 52 is preferably formed of spun bonded polyester fibers configured in the form of nonwoven sheets of the same having the desired fluid flow through and particle retention characteristics. An example of a suitable material for use in producing the filter media 52 is the nonwoven spun bonded polyester produced by the Du Pont Company and sold under the trademark REEMAY. The material is cut into annular discs having centrally located circular openings with a diameter substantially that of the diameters of the core tubes 42 and 44 of the filter elements 12 and 14. The outer diameter of the disc is substantially that of the outer diameters of the elements 12 and 14 whereupon it is seen that the filter media 52 substantially covers the fluid entry surfaces 46 of the elements 12 and 14.

As an aid in maintaining the media 52 in a substantially flat configuration in contact with the fluid entry surfaces 46, a stretch sock 53 may be employed as shown in FIG. 1. The sock may be formed of cotton or any other suitable material and is configured to fit tightly around the elements 12 and 14 to cover their opposite planar ends holding the media 52 in the indicated configuration during use of the apparatus 10.

Figure 7:
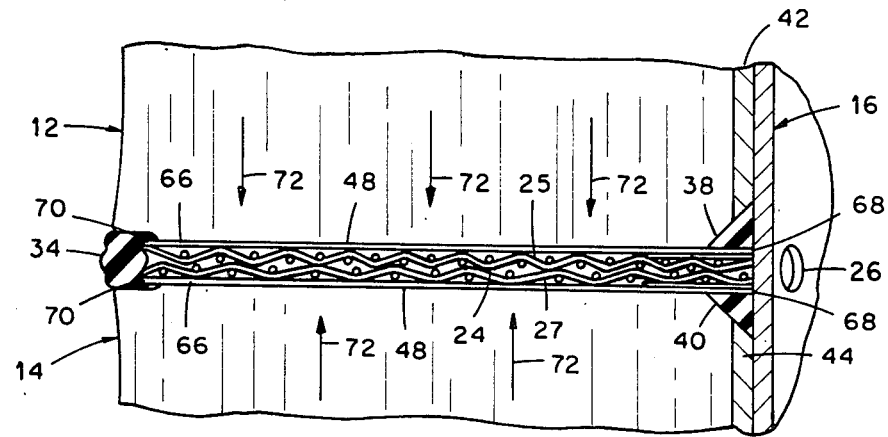
FIG. 7 is an enlarged view of a portion of the filter apparatus shown in FIG. 1.

Referring now to FIGS. 1 and 7 and in particular to the latter which is an enlarged view, a preferred means for providing a fluid exit filtration stage adjacent the fluid exit surface 48 of the filter elements 12 and 14 is illustrated and involves the use of filter media discs 66 disposed between the wire mesh spacers 25 and 27 and the fluid exit surfaces 48. The discs 66 are annular in configuration and have centrally located openings 68 substantially that of the inner diameter of the tube cores 42 and 44. The outer diameter of the discs 66 is selected so that the discs 66 extend out to near the radially outermost edge of the filter elements 12 and 14 as shown. Fluid passing through the filter elements 12 and 14 in an axial direction as at arrows 72 flows out of the fluid exit surfaces 48, through the discs 66, and into the annular space 24 which is a continuous space defined within the interstices of the wire mesh forming the spacers 25 and 27. From the space 24, the fluid flows in a right-hand direction as viewed in FIG. 7 into the outer flow tube 16 through the openings 26. The filter discs 66 operate as a final filtration stage to trap any fine particulates which may have found their way through the filter elements 12 and 14. The provision of the filter discs 66 therefore eliminates continual recirculation of fine particulates such as metal dust and the like through the system from which the liquid being filtered is drawn, which fine particulates can be a significant contribution to wear of parts, etc.

The filter discs 66 are preferably maintained in substantial contact with the fluid exit surface 48 by engaging the filter discs 66 between the wire mesh spacers 25 and 27 and the fluid exit surfaces 48. This would be accomplished for example, during construction of the apparatus 10 as shown in FIG. 2 by determining the sequence in which the various components of the apparatus 10 are disposed on the outer flow tube 16 so that in the final arrangement, the discs 66 are between the wire mesh spacers 25 and 27 and the fluid exit surfaces 48 as shown.

A preferred means for eliminating flow bypass around the inner and outer radial edges 68 and 70 of the filter discs 66 involves contacting the discs 66 adjacent their inner and outer edges 68 and 70 with the inner seals 38 and 40 and outer seal 34 when the seals are formed as described in U.S. Pat. No. 4,579,657 to Hood. Most advantageously, the inner and outer edges 68 and 70 are embedded in the sealing material when the latter is in its melted state. When the sealing material cools and hardens, it adheres in a fluid impervious manner to the discs 66 and the surfaces of the filter elements 12 and 14 and outer flow tube 16 with which the material is in contact, firmly sealing the filter discs 66 to the fluid exit surfaces 48 around the inner and outer edges 68 and 70. Fluid flowing out of the fluid exit surfaces 48 is therefore confined to the immediate space between the discs 66 and exit surfaces 48 and consequently must flow through the discs 66 before entering the space 24 therebetween.

As with the filter media 52 disposed adjacent the fluid entry surfaces 46, the filter discs 66 have also been found to aid in maintaining an even flow distribution through the elements 12 and 14. It is believed that this particular benefit of the filter discs 66, as an exit filtration stage, is due to the imposition of a slight back pressure on the fluid exit surfaces 48 which helps minimize unequal flow out from between adjacent tissue layers or adjacent areas of tissue layers, which unequal flow may be a result of irregularities in the construction of the elements 12 and 14 or of the tendency of the elements 12 and 14 to form axial flow bypass channels as described.

The filter discs 66 are preferably constructed from sheets of resin bonded glass microfiber filter media laminated with spun bonded polyester. A suitable material for this purpose is the filter media sold by Hollingsworth and Vose Company located in East Walpole, Massachusetts, under the trademark HOVOGLAS identified under the product designation LL-1111-A-A wherein the laminated glass filter media including spun bonded polyester is laminated on two sides. An alternately preferable material for use in constructing the discs 66 is the product generally referred to as "needled felt" which is easily fabricated and cut to provide the desired shape and flow-through characteristics.

Although a particular embodiment of the present invention has been described in the foregoing detailed description, it will be understood that the invention is capable of numerous rearrangements, modifications and substitutions of parts without departing from the scope of the invention according to the claims below.

What is claimed is:

1. In a filter apparatus for filtering fluids having at least one filter element constructed of tissue layers and configured to filter contaminants from the fluid by passing the contaminated fluid into a fluid entry surface disposed in a plane generally perpendicular to the tissue layers and located at a first end of the filter element, through and between the tissue layers in a direction towards a second axial end of the filter element, and out of a fluid exit surface located at the second end of the filter element, the improvement comprising entry filter means disposed adjacent the fluid entry surface and configured to filter the fluid flowing into said fluid entry surface, distribute the flow of fluid across the fluid entry surface to minimize the tendency of the fluid flowing into the fluid entry surface to produce channels between the tissue layers, which channels extend axially at least partially through the body of the filter element from openings in the fluid entry surface and permit contaminated fluid flowing therein to bypass filtration, and substantially plug any of said channels which are opened by fluid flowing into the fluid entry surface, exit filter means disposed adjacent the fluid exit surface of the filter element for substantially removing particulates remaining in the fluid exiting said fluid exit surface, seal means for sealing said exit filter means to said fluid exit surface so that fluid exiting said fluid exit surface passes substantially only through said exit filter means, and means for maintaining said exit filter means in the immediate vicinity of fluid exiting said fluid exit surface, said exit filter means comprising a web including resin bonded glass microfibers laminated with spun bonded polyester configured to provide minimal resistance to the flow of fluid passing therethrough and to remove substantially all of the particulates in the fluid having a nominal diameter greater than about 10 microns.

2. In a filter apparatus for filtering fluids having at least one filter element constructed of tissue layers and configured to filter contaminants from the fluid by passing the contaminated fluid into a fluid entry surface disposed in a plane generally perpendicular to the tissue layers and located at a first end of the filter element, through and between the tissue layers in a direction towards a second axial end of the filter element, and out of a fluid exit surface located at the second end of the filter element, the improvement comprising entry filter means disposed adjacent the fluid entry surface and configured to filter the fluid flowing into said fluid entry surface, distribute the flow of fluid across the fluid entry surface to minimize the tendency of the fluid flowing into the fluid entry surface to produce channels between the tissue layers, which channels extend axially at least partially through the body of the filter element from openings in the fluid entry surface and permit contaminated fluid flowing therein to bypass filtration, and substantially plug any of said channels which are opened by fluid flowing into the fluid entry surface, exit filter means disposed adjacent the fluid exit surface of the filter element for substantially removing particulates remaining in the fluid exiting said fluid exit surface, seal means for sealing said exit filter means to said fluid exit surface so that fluid exiting said fluid exit surface passes substantially only through said exit filter means, and means for maintaining said exit filter means in the immediate vicinity of fluid exiting said fluid exit surface, said seal means comprising a thermoplastic material having a melting point higher than the highest expected operating temperature of the filter, said material adhering to said exit filter means and the filter element and being applied so that fluid exiting said fluid exit surface is substantially confined to a space between said fluid exit surface and said exit filter means whereby fluid exiting said fluid exit surface passes substantially only through said exit filter means.

3. In a filter apparatus having at least first and second filter elements constructed of wound paper layers mounted coaxially and proximately on a center flow tube in a spaced-apart adjacent relationship with apertures formed in the tube between the filter elements, a first glue seal formed between the two filter elements adjacent to the circumference of each filter element, a second glue seal formed between the first filter element and the center flow tube, and a third glue seal formed between the second filter element and the center flow tube, the improvement comprising:

a first after-filter disposed in the region between the first and second filter elements adjacent to the first filter element;

a first outer peripheral edge formed on said first after-filter and sealingly disposed in said first glue seal;

a first inner edge formed on said first after-filter and sealingly disposed in said second seal;

a second after-filter disposed in the region between the first and second filter elements adjacent to the second filter element;

a second outer peripheral edge formed on said second filter element and sealingly disposed in said first glue seal;

a second inner edge formed on said second after-filter and sealingly disposed in said third seal; and porous spacing means disposed between said first and second after-filters so that a first fluid flow path is defined through the first filter element, through the first after-filter, through the porous spacing means, through the apertures and into the center flow tube and a second fluid flow path is defined through the second filter element, through said second after-filter, through said porous spacing means, through the apertures and into the center flow tube.

* * * * *